US011634119B2

(12) United States Patent
Hüger et al.

(10) Patent No.: US 11,634,119 B2
(45) Date of Patent: Apr. 25, 2023

(54) METHOD OF DETERMINING A PARKING POSITION FOR A MOTOR VEHICLE, DRIVER ASSISTANCE SYSTEM FOR PERFORMING SUCH METHOD, AND MOTOR VEHICLE WITH A DRIVER ASSISTANCE SYSTEM

(71) Applicant: Volkswagen Aktiengesellschaft, Wolfsburg (DE)

(72) Inventors: Philipp Hüger, Rühen (DE); Sebastian Busch, Braunschweig (DE); Daniel Thomanek, Berlin (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 114 days.

(21) Appl. No.: 17/468,925

(22) Filed: Sep. 8, 2021

(65) Prior Publication Data
US 2022/0073056 A1 Mar. 10, 2022

(30) Foreign Application Priority Data
Sep. 9, 2020 (DE) ..................... 10 2020 211 332.7

(51) Int. Cl.
*B60W 30/06* (2006.01)
*G06V 20/58* (2022.01)
(Continued)

(52) U.S. Cl.
CPC .......... *B60W 30/06* (2013.01); *G05D 1/0234* (2013.01); *G06V 20/586* (2022.01);
(Continued)

(58) Field of Classification Search
CPC .............. B60W 30/06; B60W 2552/53; G05D 1/0234; G05D 2201/0213; G06V 20/586;
(Continued)

(56) References Cited

U.S. PATENT DOCUMENTS

| 8,319,663 B2 | 11/2012 | Von Reyher et al. ..... 340/932.2 |
| 8,779,941 B2 | 7/2014 | Amir .......................... 340/932.2 |

(Continued)

FOREIGN PATENT DOCUMENTS

| DE | 102011077173 A1 | 12/2012 | ............ B60W 30/06 |
| DE | 102014011108 A1 | 1/2016 | ............ B60W 30/06 |

(Continued)

OTHER PUBLICATIONS

German Office Action, Application No. 102020211332.7, 6 pages, dated May 7, 2021.

*Primary Examiner* — Daryl C Pope
(74) *Attorney, Agent, or Firm* — Slayden Grubert Beard PLLC

(57) ABSTRACT

The invention relates to a method for determining a parking position for a motor vehicle, wherein a perpendicular parking space is detected by means of a sensor system of the motor vehicle, and a parking space data set characterizing the perpendicular parking space is provided to a control unit of the motor vehicle, and the parking position is determined by the control unit by using the parking space data set, as well as by using an access parameter of the motor vehicle that characterizes a possible opening of at least one folding element of the motor vehicle. The invention provides that the parking position is established using an additional access parameter of an additional motor vehicle that is parked adjacent to the parking position. Moreover the invention relates to a driver assistance system and a motor vehicle.

20 Claims, 6 Drawing Sheets

(51) Int. Cl.
    *G06V 20/56* (2022.01)
    *G05D 1/02* (2020.01)
(52) U.S. Cl.
    CPC ....... *G06V 20/588* (2022.01); *B60W 2552/53* (2020.02); *G05D 2201/0213* (2013.01)
(58) Field of Classification Search
    CPC .... G06V 20/588; G08G 1/168; B62D 15/027; B62D 15/0285
    See application file for complete search history.

(56) References Cited

U.S. PATENT DOCUMENTS

| | | |
|---|---|---|
| 10,081,390 B1 | 9/2018 | Anderson et al. |
| 10,304,335 B2 | 5/2019 | Jain et al. |
| 10,328,932 B2 | 6/2019 | Gieseke et al. |
| 10,606,272 B2 | 3/2020 | Seo et al. |
| 2017/0096168 A1 | 4/2017 | Yang et al. ..................... 701/41 |
| 2022/0203896 A1* | 6/2022 | Choi ..................... B60W 30/09 |

FOREIGN PATENT DOCUMENTS

| | | | | |
|---|---|---|---|---|
| DE | 102018214915 A1 | 3/2020 | ............... | G08G 1/14 |
| EP | 2597016 A1 | 5/2013 | ............. | B62D 15/02 |
| EP | 3081731 A1 | 10/2016 | ............. | E05C 17/30 |
| GB | 2491720 A | 12/2012 | ............. | B62D 15/02 |
| WO | 2018/177702 A1 | 10/2018 | ............. | B62D 15/02 |

\* cited by examiner

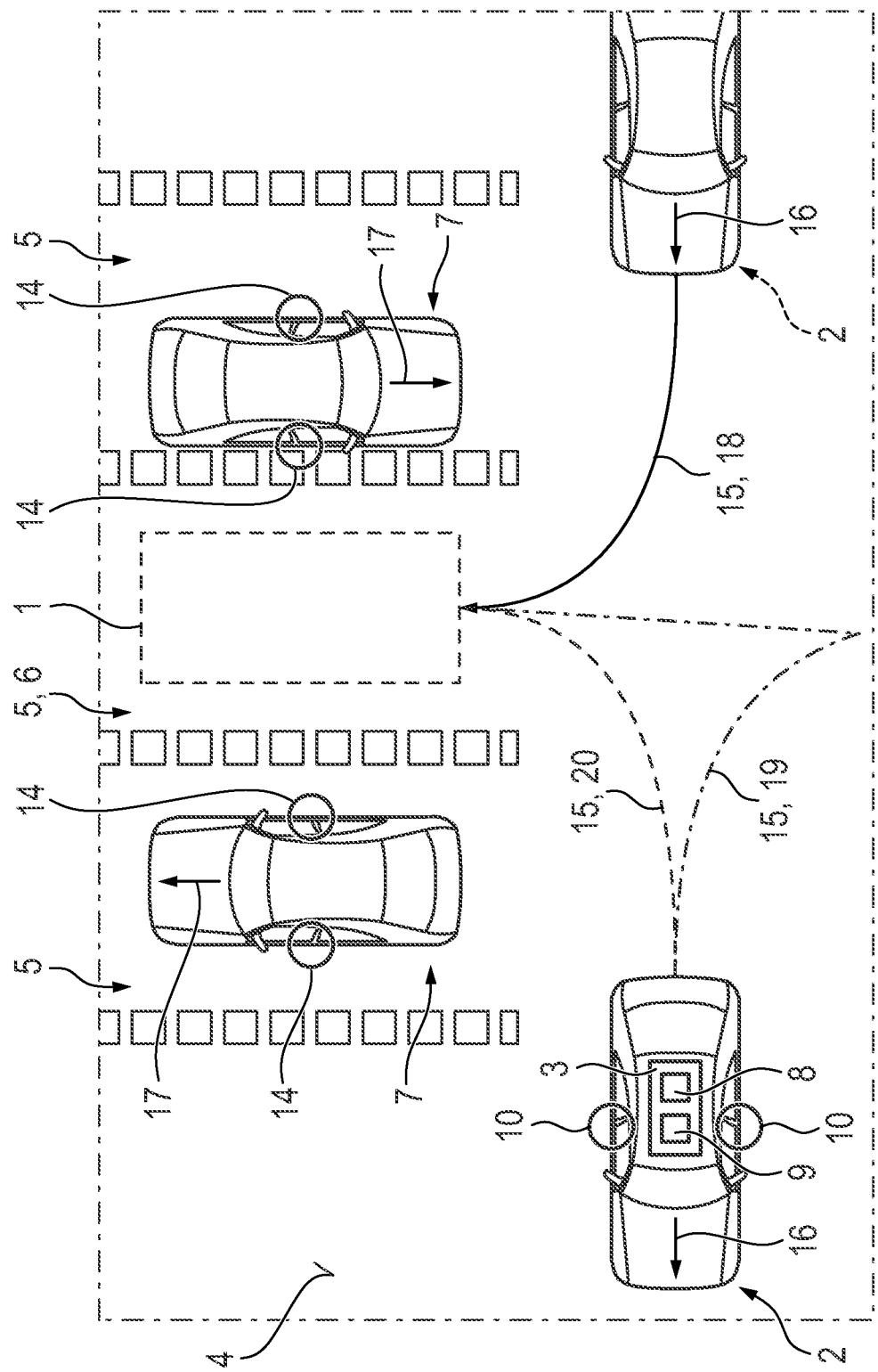

METHOD OF DETERMINING A PARKING POSITION FOR A MOTOR VEHICLE, DRIVER ASSISTANCE SYSTEM FOR PERFORMING SUCH METHOD, AND MOTOR VEHICLE WITH A DRIVER ASSISTANCE SYSTEM

CROSS-REFERENCE TO RELATED APPLICATIONS

This application claims priority to German Patent Application No. DE 10 2020 211 332.7, filed on Sep. 9, 2020 with the German Patent and Trademark Office. The contents of the aforesaid Patent Application are incorporated herein for all purposes.

TECHNICAL FIELD

The invention relates to a method for determining, or respectively ascertaining a parking position for an unparked vehicle that is to be parked on a perpendicular parking space with reference to the parking position that is ascertained, or respectively to be ascertained. Moreover, the invention relates to a driver assistance system, in particular an at least partially automated park assistance system. Finally, the invention relates to a motor vehicle, in particular a passenger car, that is equipped with such a driver assistance system.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Driver assistance systems that at least partially assist a user, in particular a driver, of a motor vehicle when parking the motor vehicle, or respectively corresponding methods, are known from the prior art.

However, the problem frequently exist today that parking spaces, in particular perpendicular parking spaces that for example are delimited from each other by means of a ground marker are not completely, or respectively entirely useful since vehicles parking adjacent to this perpendicular parking space park too closely to the designated perpendicular parking space on their parking spaces adjacent to the perpendicular parking space, or even at least partially occupy the perpendicular parking space on which the motor vehicle is to be parked. In other words, the adjacent motor vehicles at least partially block the parking space in that the neighboring motor vehicles have been placed on the ground marker, or extending over the ground marker. It is true that leaving one's own motor vehicle may be ensured by the conventional vehicle exit assistance system in certain circumstances; however, situations may still arise in which entering and subsequently driving away an adjacently parked vehicle is then no longer reliably ensured given the optimum parking position that has then been established by the vehicle exit assistance system. If for example the motor vehicle is parked according to the parking position ascertained by the vehicle exit assistance system, it could accordingly be too close to the adjacent motor vehicle so that for example a driver's door of the adjacent motor vehicle cannot, or may only be insufficiently opened, and the driver of the adjacent motor vehicle may therefore only enter his motor vehicle with great difficulty. There furthermore is the danger that the driver of the adjacent motor vehicle will damage the motor vehicle equipped with the vehicle exit assistance system when attempting to open the driver's door.

On the one hand, an accident hazard between the adjacently parking motor vehicles exists, and the stress level and/or frustration level of the driver who wants to drive away with the adjacent motor vehicle is problematically elevated, which may negatively affect traffic safety during a possible trip. The driver of the adjacent motor vehicle perceives the motor vehicle equipped with the vehicle exit assistance system as having parked very inconsiderately. This entire problem is further enhanced in that, with densely populated regions such as large cities, parking space is or is becoming generally scarce, and a particularly efficient use of parking space is therefore desirable.

SUMMARY

A need exists to enable particularly efficient and particularly safe parking of motor vehicles.

The need is addressed by a method having the features of the independent claims. Embodiments of the invention are described in the dependent claims, the following description, and the drawings.

BRIEF DESCRIPTION OF THE DRAWINGS

FIG. 1 shows an exemplary schematic view of a parking area that has at least three perpendicular parking spaces, of which an empty one of the perpendicular parking spaces is bordered on the right and left by an adjacently parked motor vehicle, wherein it is to be driven onto the empty perpendicular parking space by means of an ego motor vehicle;

DESCRIPTION

Figure 2A:
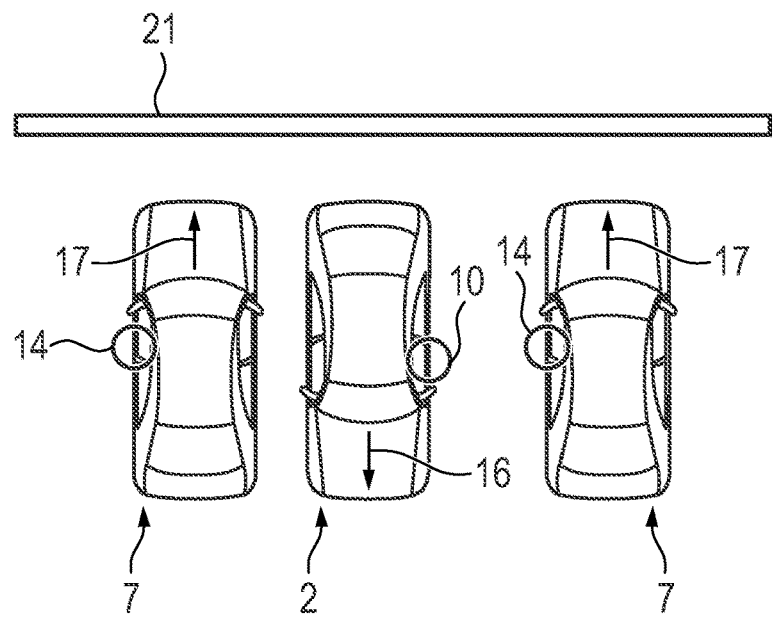
FIGS. 2a-2d show an exemplary schematic view of four parking situations in which a forward driving direction of the ego motor vehicle is oriented relative to the perpendicular parking space.
Figure 2B:
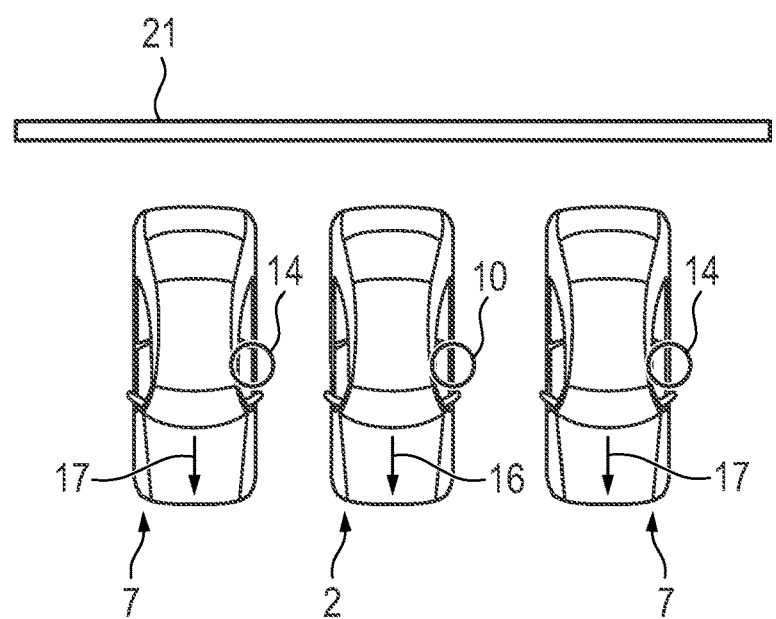
Figure 2C:
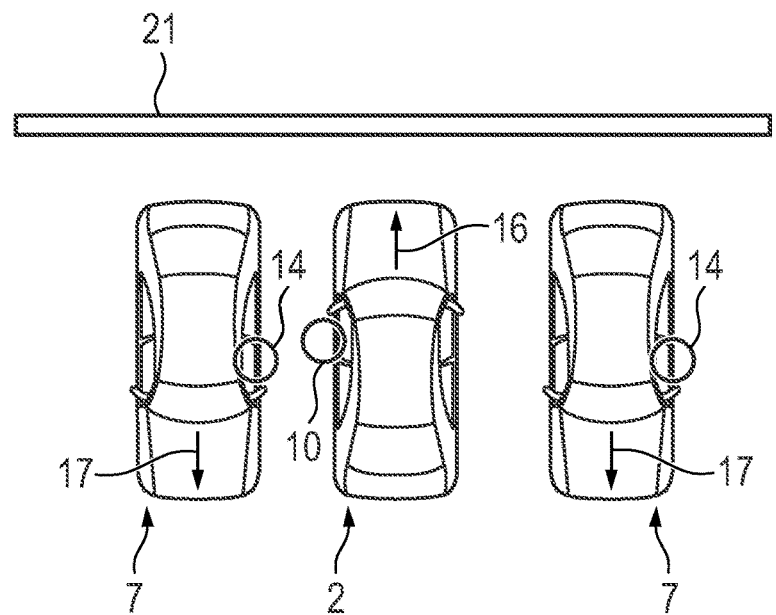
Figure 2D:
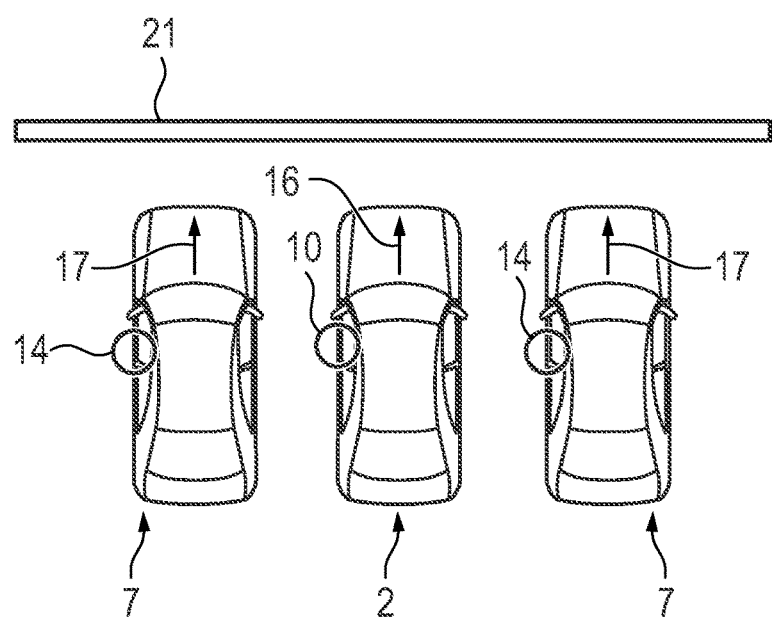

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

In a first exemplary aspect, a method for determining a parking position for a motor vehicle is proposed. A parking position for the unparked motor vehicle is determined, or respectively ascertained by means of the method, wherein the motor vehicle is then to be parked by using the parking position that is ascertained, or respectively to be ascertained on a perpendicular parking space. The motor vehicle that is to be parked by using the parking position will hereinafter be termed an ego motor vehicle and is in particular designed as a car such as a passenger car.

In the method, a perpendicular parking space is at least partially detected by means of a sensor system of the ego motor vehicle. In other words, the sensor system of the ego motor vehicle creates data that characterize the perpendicular parking space, for example represent a width, depth, etc. of the perpendicular parking space. Accordingly, the sensors in the method provide a parking space data set, that at least partially characterize the perpendicular parking space, which is provided to a control unit of the ego motor vehicle. The control unit is in particular the control unit of a driver assistance system, in particular a park assistance system. The parking space data set therefore at least partially characterizes the perpendicular parking space on/in which parking is to occur by means of the ego motor vehicle. This means that conditions prevailing in the perpendicular parking space are characterized by the parking space data set. Consequently, the conditions characterizing the perpendicular parking space are provided to the control unit of the ego vehicle in the form of data, i.e., in the form of the parking space data set. The conditions that at least partially characterize the perpendicular parking space include, in addition to the width and depth of the perpendicular parking space, whether at least one additional motor vehicle is parked adjacent, in particular directly adjacent to the perpendicular parking space, an orientation, or respectively parking position of the adjacently parked motor vehicle on its parking space, objects in/on the perpendicular parking space, etc.

The method moreover provides that the parking position is determined by the control unit by using the parking space data set, as well as by using at least one access parameter of the ego motor vehicle, wherein the access parameter of the ego motor vehicle characterizes a possible opening of at least one folding element of the ego motor vehicle. The at least one access parameter of the ego motor vehicle therefore characterizes whether, or respectively the extent to which, the corresponding folding element of the motor vehicle may be opened when the ego motor vehicle has been parked on the perpendicular parking space. The folding element is in particular a door or another flap of the ego motor vehicle, wherein this flap, or respectively the corresponding folding element, may be adjusted between a closed position and at least one open position. In the closed position that is established by a first end stop of the folding element, an opening of an outer skin of the ego motor vehicle is completely closed by means of the folding element. Contrastingly in a position of the folding element different from the closed position, said opening is at least partially open, which means that the folding element is then at least partially adjusted into the open position in this state once the folding element is disengaged from the end stop of the closed position. At an end stop opposite, or respectively opposing the first end stop along a displacement path of the folding element, the folding element is adjusted completely into the open position, and the associated opening in the outer skin of the ego motor vehicle is opened as much as is possible when the folding element is properly used, in particular to the maximum.

Since conventional motor vehicles have several folding elements, it is in particular provided that a number of the access parameters of the ego motor vehicle correspond to a number of the folding elements of the ego motor vehicle. If the ego motor vehicle for example has four doors as well as a luggage compartment lid, it means that these five folding elements of the vehicle are relevant to the method. In particular, the ego motor vehicle in this case has for example five access parameters to be considered separately from each other. If other folding elements of the ego motor vehicle are to be taken into account for the method, for example an engine compartment hood, a fuel filler door, etc., the number of access parameters increases correspondingly.

To enable particularly safe and particularly efficient parking of the ego motor vehicle by means of the method, it is provided that the parking position is established by using at least one additional access parameter of at least one additional motor vehicle that is parked adjacent to the designated, or respectively intended parking position. In this case, the additional access parameters of the at least one additional motor vehicle are configured analogously to the above-described access parameters of the ego motor vehicle. Accordingly, the parking position is therefore determined by means of the control unit in that the control unit processes, or further processes, the parking space data set, the at least one access parameter of the ego motor vehicle, as well as the at least one additional access parameter of the adjacently parking motor vehicle. Expressed otherwise, the control unit evaluates the parking space data set and the access parameters of the ego motor vehicle together with the access parameters of the adjacent motor vehicle in order to ascertain or determine the parking position, by means of which the ego motor vehicle is ultimately to be parked or is being parked on the parking space, or respectively perpendicular parking space.

Since not just the access parameters of the ego motor vehicle, but also the access parameters of the adjacently parked motor vehicle are taken into account in the method, particularly efficient and particularly safe parking of the ego motor vehicle is ensured, since not just particularly easy, or respectively effortless exiting of the ego motor vehicle is considered, but an orientation and/or a possible opening of at least one folding element of the adjacently parked motor vehicle is also taken into account. Consequently, a particularly easy opening of the corresponding folding element and therefore a particularly easy entrance into the adjacently parked motor vehicle is provided. As a consequence, the ego motor vehicle is parked very efficiently, and the adjacently parked motor vehicle is minimally blocked. A risk is therefore reduced that a user, in particular a driver, of the adjacently parked motor vehicle will undesirably strike the ego motor vehicle when opening a corresponding folding element, for example a driver's door of the adjacently parked motor vehicle, and thereby damage the adjacently parked motor vehicle, and/or the ego motor vehicle. Furthermore, the driver of the adjacently parked motor vehicle perceives that it has been parked very cautiously by means of the ego motor vehicle, whereby an acceptance of the ego motor vehicle, and consequently the driver assistance system of the ego motor vehicle, is very high. Moreover, a stress level, or respectively frustration level of the driver of the adjacently parked motor vehicle is very low when entering therein, whereby subsequently, for example while then driving the adjacently parked vehicle, traffic safety is particularly high. Traffic safety depends to a great extent on a state of mind of the (human) road users.

In some embodiments, an orientation of a forward driving direction of the ego motor vehicle relative to the perpendicular parking space is determined in order to determine the parking position by means of the control unit by using the parking space data set, and by using the access parameters, i.e., both by using the at least one access parameter of the ego motor vehicle as well as by using the at least one access parameter of the adjacently parked motor. Expressed otherwise, to determine the parking position by means of the control unit, it is determined whether it is driving, or respectively should be driven forward or in reverse into/onto the perpendicular parking space by means of the ego vehicle. If the perpendicular parking space onto/into which should be parked by means of the ego motor vehicle is directly bordered on the right and left by a particular adjacently parked motor vehicle that are both parked forward, it may be parked very efficiently by means of the ego motor vehicle by parking it in reverse between the two adjacently parked motor vehicles. A front passenger side of the ego motor vehicle and a front passenger side of one of the adjacently parked motor vehicles face other, whereby a driver's side of the ego motor vehicle and a driver's side of the corresponding other adjacently parked motor vehicle face each other. This makes it possible for example to select a smaller distance between the aforementioned front passenger sides than a distance between the aforementioned driver's sides which provides a great deal of room, or respectively space in a region of the particular driver's door of the ego motor vehicle and the adjacently parked motor vehicle so that both the driver of the ego motor vehicle as well as the driver of the corresponding adjacently parked motor vehicle may get in, or respectively out with very little effort.

In this context, it has proven to be beneficial if the orientation of the forward driving direction of the ego motor vehicle relative to the perpendicular parking space is furthermore made dependent on a road type bordering the perpendicular parking space, and/or a complexity of a driving maneuver required to drive onto the perpendicular parking space, and/or an orientation of a forward driving direction of the adjacently parked motor vehicle, and/or a load status of a luggage compartment of the ego motor vehicle. A particular orientation is provided in association with the orientation of the forward driving direction of the ego motor vehicle relative to the perpendicular parking space, i.e., whether it should be parked in reverse or forward onto the perpendicular parking space by means of the ego motor vehicle. If the perpendicular parking space for example borders a municipal road, i.e., if the perpendicular parking space is entered upon leaving the municipal road, the determination of the parking position includes for example driving in reverse onto/into the perpendicular parking space. If the driving maneuver that is to be used to drive onto the perpendicular parking space is very complex, for example due to very high traffic on the road bordering the perpendicular parking space, it may be provided that the perpendicular parking space is entered from the forward direction in order for the ego motor vehicle to leave the road as quickly as possible and for example restrict a flow of traffic on the road as little as possible. Moreover and as described above, the orientation of the forward driving direction of the ego motor vehicle may be selected with reference to a forward driving direction of at least one adjacently parked motor vehicle, or with reference to a particular forward driving direction of adjacently parked motor vehicles. To make it possible to unload or load the luggage compartment of the ego motor vehicle, for example a trunk, very efficiently, or respectively with little effort, the orientation of the forward driving direction of the ego motor vehicle may be correspondingly determined such that it allows the user of the ego motor vehicle to open, or respectively close the corresponding folding element of the luggage compartment, for example the trunk lid, with little effort, and very easily reach it beforehand.

Some embodiments provide that a horizontal offset is determined between a perpendicular longitudinal median plane of the ego motor vehicle and a perpendicular longitudinal median plane of the perpendicular parking space to determine the parking position by means of the control unit using the parking space data set and using the access parameters, i.e., by using the access parameter or the access parameters of the ego motor vehicle in conjunction with the access parameter or the access parameters of the adjacently parking vehicle. That is, the control unit determines the parking position for example such that the perpendicular longitudinal median plane of the ego motor vehicle and the perpendicular longitudinal median plane of the perpendicular parking space coincide if possible given the conditions at the perpendicular parking space characterized by the parking space data set and the access parameters. In this case, the horizontal offset between the longitudinal median planes is then zero. Moreover, the parking position may be determined by means of the control unit such that the perpendicular longitudinal median plane of the ego motor vehicle and the perpendicular longitudinal median plane of the perpendicular parking space do not coincide if this is caused by at least one of the access parameters. In this case, the horizontal offset between the longitudinal median planes is not zero, which means that the ego motor vehicle is parked eccentrically with reference to the perpendicular parking space, for example to ensure safe entering, or respectively exiting into, or respectively out of the ego motor vehicle, and/or into, or respectively out of the adjacently parked motor vehicle.

It has moreover proved to be beneficial if, based on an available width of the perpendicular parking space, a width of the ego motor vehicle (ego motor vehicle width), and the at least one access parameter that characterizes an open position of the folding element, the perpendicular parking space is categorized by means of the control unit as a safely usable perpendicular parking space, as a small perpendicular parking space, as a critical perpendicular parking space, or as a perpendicular parking space that cannot be safely used. In this case, the available width of the perpendicular parking space is detected, or respectively ascertained by means of the sensor system of the ego motor vehicle, wherein the available width of the perpendicular parking space may deviate from a marked width of the perpendicular parking space. As already mentioned, conditions may exist at the perpendicular parking space that at least prevent a complete, or respectively entire use of the perpendicular parking space, for example because one of the adjacent motor vehicles is parked partially on or across the ground marker of the perpendicular parking space. Accordingly, a perpendicular width between the road marker lines is greater than the actually available width of the perpendicular parking space so that the perpendicular parking space may only be used to the extent of the actually available width. If therefore at least one object, for example an adjacently parked motor vehicle, extends into the perpendicular parking space on which it is to be parked by means of the ego motor vehicle, the width of the perpendicular parking space that is actually available for parking is reduced by said object. If the perpendicular parking space is bordered on the right and left side of an adjacently parked motor vehicle, for example the available width of the perpendicular parking space between the adjacently parked motor vehicles at a distance from each other across the perpendicular parking space is correspondingly measured. The motor vehicle width of the ego motor vehicle, or respectively the ego motor vehicle width is known from the production of the ego motor vehicle and is for example saved it in a memory unit of the control unit, or respectively the driver assistance system. Accordingly, the control unit has access to information characterizing the ego motor vehicle width in the form of data for determining the parking position.

The at least one access parameter of the ego motor vehicle that is used to categorize the perpendicular parking space represents at least one open position of one of the doors of the ego motor vehicle, for example the driver's door. It is known that when a driver's door of a motor vehicle is swung out of a completely closed state toward a completely open position, it is held in a first catch position that may be overcome by applying additional opening force so that the driver's door, after overcoming the first catch position, is held in a second catch position that represents an intended end stop in the open position of the driver's door. In other words, to move the driver's door completely into the open position, it must be pushed beyond the first catch position until the driver's door is completely, or respectively open to a maximum extent as intended in the second catch position. With regard to the particular access parameter of the ego vehicle, this means that a first access parameter of the ego motor vehicle characterizes the driver's door in the first catch position, whereas a second access parameter that differs from the first access parameter characterizes the driver's door in the second catch position, or respectively in the completely open state. When the driver's door is arranged in the particular catch position, it is associated with a lateral space requirement that is needed to move the driver's door, or respectively the corresponding folding element into the corresponding catch position. In other words, a first distance is provided on one side (driver's side, or respectively front passenger side) of the ego motor vehicle which is necessary to move the corresponding folding element into the first catch position. Moreover, a second distance is provided on the same side that on the one hand is greater than the first distance, and on the other hand is needed to move the corresponding folding element into the second catch position. Furthermore on this side, a safe distance is provided that is smaller than the first distance which is needed for the ego motor vehicle, in particular the driver assistance system, or respectively the at least partially automated park assistance system, to function properly in order to provide the user, or respectively driver of the motor vehicle with the assistance functions for parking, in particular the method described herein.

Over the course of the method, or respectively while performing the method, the perpendicular parking space on which the ego motor vehicle is to be parked, is for example categorized as a safely usable perpendicular parking space. This is the case if:

$$B \geq b + 2 \cdot d_2$$

with B: available width of the perpendicular parking space
b: ego motor vehicle width
$d_2$: second distance.

If these conditions apply to the parked ego motor vehicle in conjunction with the perpendicular parking space, it is possible to open the particular folding element on the driver's side as well as on the front passenger side of the ego motor vehicle, in particular both the driver's door and the front passenger door, to the maximum extent, i.e., to move them both into the second catch position. This ensures that the user of the ego motor vehicle may enter, or respectively exit very easily and comfortably.

The perpendicular parking space on which the ego motor vehicle is to be parked is contrastingly categorized as a small perpendicular parking space when:

$$b + 2 \cdot d_2 > B \geq b + 2 \cdot d_1$$

with $d_1$: first distance.

This means that the use of the perpendicular parking space for parking the ego motor vehicle is at least restricted since, under these conditions, it is impossible to move the front passenger door as well as the driver's door into the second catch position, or respectively to completely open them. It is however possible to move the corresponding folding element, i.e., both the driver's door and the front passenger door, into the first catch position on the right side and left side of the ego motor vehicle in which the particular door is not completely open, but exiting, or respectively entering is still ensured.

Moreover, the perpendicular parking space on which is to be parked by means of the ego motor vehicle is categorized as a critical perpendicular parking space when:

$$b + 2 \cdot d_1 > B \geq b + 2 \cdot d_S$$

with $d_S$: Safety distance.

If the ego motor vehicle is parked on such a critical perpendicular parking space, it is impossible on both sides of the ego motor vehicle to move the front passenger door, or respectively the driver's door into the first catch position. Consequently, the user of the ego motor vehicle would have to hold the particular door between the completely closed position and the first catch position in order to exit the ego motor vehicle. This is very involved, and particularly easy exiting of the ego motor vehicle is therefore not ensured.

Finally, it is moreover conceivable for the perpendicular parking space to be unsuitable for safely accommodating the ego motor vehicle for parking. In other words, the perpendicular parking space may be categorized as a not safely usable perpendicular parking space in the method. This is the case if:

$$B < b + 2 \cdot d_S$$

With the perpendicular parking space that is categorized as a perpendicular parking space which is not safely usable, the safety distance $d_S$ still exists on the left side and right side of the ego motor vehicle, but opening the front passenger door and/or driver's door is only possible to such a slight extent that safely exiting the ego motor vehicle and safely entering the ego motor vehicle may no longer be ensured.

It is beneficial for the method to know the parking space category of the perpendicular parking space before driving the ego motor vehicle onto the perpendicular parking space and then parking thereupon. For example, the recognized category of the perpendicular parking space may be provided to a user of the ego motor vehicle, in particular the driver, for example through an output unit (display, loudspeaker, etc.), and then the driver is provided with a possible choice of actually parking on the perpendicular parking space or continuing a parking space search.

If in this context the perpendicular parking space is categorized as a small perpendicular parking space, by means of the control unit it may be determined the parking position to provide at least one of the folding elements of the ego motor vehicle, i.e., for example the driver's door or the front passenger door, with a comfort distance from the adjacently parked motor vehicle. Moreover it may optionally be provided that, before the ego motor vehicle drives onto the parking space, it is suggested that the front passenger and/or an (additional) passenger of the ego motor vehicle exit/exits the ego motor vehicle on the front passenger side. The output unit may, for example, be used for this. If the comfort distance, which is the second distance, is provided on at least one side of the ego motor vehicle, at least the driver and/or passengers may move the relevant folding element into the second catch position, on the driver's side of the ego motor vehicle, even with a perpendicular parking space that is at least partially of limited use, in order to subsequently exit the ego motor vehicle very comfortably.

If the perpendicular parking space is categorized as a critical perpendicular parking space, it may be provided that the parking position is to be determined by means of the control unit such to provide at least one of the folding elements of the ego motor vehicle with a minimum distance, which is the first distance, to the adjacently parked motor vehicles. In this context, it may optionally be suggested that the front passenger and/or passengers on the front passenger side of the ego motor vehicle exit/exits the ego motor vehicle before the ego motor vehicle drives onto the critical perpendicular parking space. If the perpendicular parking space is even more restricted so that the perpendicular parking space is no longer a small perpendicular parking space but rather a critical perpendicular parking space whose available width is less than a small perpendicular parking space, at least the driver of the ego motor vehicle and/or passengers on a driver's side of the ego motor vehicle may then move the corresponding folding element, or respectively a driver's door, or a door of the ego motor vehicle different from the driver's door and arranged on the driver's side of the ego motor vehicle, into the first catch position. While efficiently exploiting a parking space, this moreover ensures that at least the driver may exit the ego motor vehicle when the ego motor vehicle has been arranged on the critical perpendicular parking space using the parking position.

In some embodiments, the sensor system by means of which the perpendicular parking space is detected at least partially in order to provide the parking space data set has two sensor units that are designed differently from each other. This means that the two sensor units of the sensor system that are designed differently from each other are used to detect the perpendicular parking space, wherein a first of these sensor units detects a ground marker defining the perpendicular parking space, and a second of these sensor units that is designed differently from the first sensor unit detects a free volume of the perpendicular parking space. Accordingly, the first sensor unit is a sensor unit by means of which a recognition of a parking marker may be carried out or is carried out. Accordingly, the second sensor unit is a sensor unit by means of which a recognition of free volume may be carried out or is carried out. For example, the sensor unit for recognizing the parking marker is a camera-based sensor system by means of which the ground markers, or respectively parking markers are detected, and a reference data set characterizing the road marker, or respectively parking marker, is provided to the control unit. The sensor unit for recognizing free volume is for example a radar sensor system that detects the free volume of the perpendicular parking space and provides the control unit with a free volume data set partially characterizing the perpendicular parking space. The free volume of the perpendicular parking space is a volume of the perpendicular parking space that is free from objects such as vehicles, columns and/or other solid objects. The free volume, or respectively free volumes of the perpendicular parking space are arranged over the ground area of the perpendicular parking space, i.e., delimited at the bottom by the ground surface of the perpendicular parking space.

The free volume data set and the reference data set are for example combined, or respectively linked with each other by way of IT by means of the sensors, and are further processed into the parking space data set, or are linked by way of IT to the parking space data set. In other words, the parking space data set is provided to the control unit by means of the sensor system based on the reference data set and the free volume data set, and a corresponding parking position is consequently ascertained by means of the control unit which characterizes safe parking of the ego motor vehicle on the perpendicular parking space.

Since two sensor units that are designed different from each other are used to detect the perpendicular parking space, particularly reliable recognition of the actually free volume of the perpendicular parking space is ensured, wherein the ground marker of the perpendicular parking space, or respectively the parking marker, serves as a reference for the parking space data set. This makes a parking process by using the method highly intuitive to the user of the ego motor vehicle since, when parking is unassisted, the (human) driver of the ego motor vehicle also uses the parking marker, or respectively ground marker, of the perpendicular parking space as a reference for the parking process.

If the free volume which, simplified, has a rectangular footprint on the ground surface of the perpendicular parking space, and the for example rectangular parking markers are oblique to each other in contrast to the ideal case, the area of the perpendicular parking space that is actually useful for parking changes depending on the position of the free volume. This may for example be the case because at least one motor vehicle parking adjacent to the perpendicular parking space, in particular the two motor vehicles adjacent to the perpendicular parking space, are at an angle on their (perpendicular) parking spaces, which may hinder driving into the perpendicular parking space. Moreover due to the angled position of the adjacently parked motor vehicles along a longitudinal direction of the perpendicular parking space, and/or along the forward driving direction of the ego motor vehicle, different distances between the ego motor vehicle and the particular adjacently parked motor vehicle exist. In this context, the method provides that the available width of the perpendicular parking space between the points of the adjacently parking motor vehicles is measured with respect to a transverse direction of the perpendicular parking space that are arranged closest to each other due to the oblique position of the adjacent motor vehicles.

Alternatively or in addition, it may be provided that the available width of the perpendicular parking space is only determined at the height of the driver's door of the ego motor vehicle. When the parking position is being determined by the control unit, the control unit then takes into account that a closer distance between one of the adjacent motor vehicles and the ego motor vehicle may exist on the side of the driver's door of the ego motor vehicle.

A second exemplary aspect relates to a driver assistance system that in particular is designed as an at least partially automated park assistance system. The driver assistance system, or respectively the at least partially automated park assistance system, is designed to carry out the method according to the above description. This means that the driver assistance system may have means which are configured to perform method steps of the above presented method.

Also belonging to the present aspect are embodiments of the driver assistance system that have features which have already been described in conjunction with the embodiments of the method. For this reason, the corresponding embodiments of the driver assistance system are not again described.

Finally, a third exemplary aspect relates to a motor vehicle, in particular a passenger car, that has the above-described driver assistance system.

Also belonging to the present aspect are embodiments of the motor vehicle that have embodiments which have already been described in conjunction with the embodiments of the method, or respectively the driver assistance system. For this reason, the corresponding embodiments of the motor vehicle are not again described.

The invention also includes combinations of the features of the described embodiments.

Reference will now be made to the drawings in which the various elements of embodiments will be given numerical designations and in which further embodiments will be discussed.

In the exemplary embodiments described herein, the described components of the embodiments each represent individual features that are to be considered independent of one another, in the combination as shown or described, and in combinations other than shown or described. In addition, the described embodiments can also be supplemented by features of the invention other than those described.

Specific references to components, process steps, and other elements are not intended to be limiting. Further, it is understood that like parts bear the same or similar reference numerals when referring to alternate FIGS. It is further noted that the FIGS. are schematic and provided for guidance to the skilled reader and are not necessarily drawn to scale. Rather, the various drawing scales, aspect ratios, and numbers of components shown in the FIGS. may be purposely distorted to make certain features or relationships easier to understand.

A method for determining a parking position 1 for a motor vehicle 2 that in the following will be termed an ego motor vehicle 2, a driver assistance system 3 for carrying out the method, as well as the ego motor vehicle 2 per se will be jointly described in the following.

In this regard, FIG. 1 shows a schematic view of a parking area 4 that has at least three perpendicular parking spaces 5, of which an empty one (identified with reference sign 6) of the perpendicular parking spaces 5 is bordered on the left and right by a motor vehicle 7 parking directly adjacent. It is supposed to drive onto the perpendicular parking space 6 by means of the ego motor vehicle 2 to park the ego motor vehicle 2 on the perpendicular parking space 6. To accomplish this, the parking position 1 is ascertained by means of a sensor system 8, or respectively by means of the driver assistance system 3 having the sensor system 8. By using the parking position 1 that is, or respectively is to be ascertained, the ego motor vehicle 2 is supposed to be oriented, or respectively positioned in/on the parking space 6. To this end, the perpendicular parking space 6 is at least partially detected by means of the sensor system 8 of the ego motor vehicle 2, and a parking space data set at least partially characterizing the perpendicular parking space 6 is generated, and a control unit 9 of the ego motor vehicle 2, in particular of the driver assistance system 3, is provided. This means that the control unit 9 may be a control unit of the driver assistance system 3. When the perpendicular parking space 6 is being detected by the sensor system 8, conditions are detected that have an effect on or in the perpendicular parking space 6. For example, the sensor system 8 detects a width and a depth of the perpendicular parking space 6, and/or whether the perpendicular parking space 6 is restricted by at least one object, i.e., whether the perpendicular parking space 6 cannot be used entirely, or respectively completely due to the object.

In the method for determining the parking position 1 for the ego motor vehicle 2, access parameters 10 of the ego motor vehicle 2 are moreover taken into account. This means that the access parameters 10 are provided in the form of data to the control unit 9, for example saved in advance by means of a memory unit of the control unit 9. The access parameters 10 of the ego motor vehicle 2 characterize a particular possible opening of folding elements 11 (see FIG. 4) of the ego motor vehicle 2. The particular folding element 11 is for example a driver's door 12 of the ego motor vehicle 2, or a front passenger door 13 of the ego motor vehicle 2. It is known that a motor vehicle, and accordingly the ego motor vehicle 2, has several folding elements 11, wherein the method is then analogously applicable to these other folding elements. This means that in the following, the driver's door 12 and the front passenger door 13 will only be addressed, but these are only representative, or respectively exemplary of each folding element of the ego motor vehicle 2.

To enable very safe and very efficient parking of the ego motor vehicle 2, additional access parameters 14 are provided to the control unit 9 that also are incorporated in the method for determining the parking position 1 of the ego motor vehicle 2. This means that the control unit 9 is provided with the parking space data set, the access parameters 10 as well as the additional access parameters 14 to determine the parking position 1. Then, based on the access parameters 10, 14 and the parking space data set, the control unit 9 generates the parking position 1 that represents the orientation and/or position of the ego motor vehicle 2 before the ego motor vehicle 2 has finally parked in/on the perpendicular parking space 6. In other words, the parking position 1 forms a target orientation, or respectively target position for the ego motor vehicle 2 that, in particular with the help of the driver assistance system 3, drives onto/into the perpendicular parking space 6 according to the determined, or respectively ascertained parking position 1. In this case, it is in particular provided that the driver assistance system 3 which in particular is designed as an at least partially automated park assistance system, drives the ego motor vehicle 2 along a parking driving trajectory 15 onto/into the perpendicular parking space 6. It is particularly beneficial if the ego motor vehicle 2 drives to park on the perpendicular parking space 6 partially automatically, fully automatically or autonomously by means of the driver assistance system 3, or respectively park assistance system, i.e., engages in parking.

The additional access parameters 14 are assigned to the additional motor vehicles 7 that are parking adjacent to the parking position 1 and consequently are standing, or respectively have been parked, on the perpendicular parking space 5 directly bordering the perpendicular parking space 6. The additional access parameters 14 characterize a possible opening of at least one folding element of the adjacently parked motor vehicle 7, and are each configured analogous to the access parameters 10 of the ego motor vehicle 2. In order to be able to incorporate the access parameters 14 into the method for determining the parking position 1, the additional access parameters 14 of the control unit 9 are provided, for example detected, by means of the sensor system 8 of the ego motor vehicle 2. For example, the additional access parameters 14 characterize whether a particular driver's door or a particular front passenger door of the correspondingly adjacently parked motor vehicles 7 is facing the perpendicular parking space 6. In FIG. 1, due to the positional orientation of the adjacently parked motor vehicles 7 on the corresponding perpendicular parking spaces 5, respective front passenger doors of the adjacently parked motor vehicles 7 face the perpendicular parking space 6 on which the ego motor vehicle 2 is supposed to drive by using the method.

FIGS. 2a-2d show, in a schematic view 4, parking situations a), b), c) and d), by means of which a forward driving direction 16 of the ego motor vehicle 2 is oriented relative to the particular perpendicular parking space 6. By using a particular positional arrangement of the access parameters 10, 14 that, in FIGS. 2a-2d, characterize a position of a particular driver's door 12 of the ego motor vehicle 2 and a particular driver's door of the adjacently parked motor vehicles 7, it becomes clear, in particular in conjunction with the parking situations b), c) and d), how a particular orientation of the forward driving direction 16 of the ego motor vehicle 2 with respect to the particular perpendicular parking space 6 and/or with respect to adjacently parked motor vehicles 7 has an influence on access that is particularly comfortable, or respectively requires little effort to the particular driver's door 12 of the ego motor vehicle 2, and/or to the particular driver's door of the adjacently parked motor vehicles 7. Therefore, given a common orientation of the forward driving directions 16, 17, a constant distance between the adjacently parked motor vehicles 7 and the ego motor vehicle 2 is enabled, whereas (see parking situations a) and c)) a great deal of space may be beneficially provided at the driver's doors. This becomes very clear in conjunction with the parking situation a), wherein the ego motor vehicle 2 has been parked eccentrically on the perpendicular parking space 6 in order to provide particularly generous space between the one arranged on the right in FIGS. 2a-2d of the adjacently parked motor vehicles 7 and the ego motor vehicle 2.

Furthermore, the particular orientation of the forward driving direction 16 of the ego motor vehicle 2 may be determined relative to the perpendicular parking space 6 by using a type of road from which the perpendicular parking space 6 is directly entered. This means that the perpendicular parking space 6 and the road border each other such that the perpendicular parking space 6 is, or respectively may be directly or indirectly entered upon leaving the road. Accordingly, an orientation of the forward driving direction 16 and consequently the parking position 1 in the perpendicular parking space 6 may depend on whether the road that borders the perpendicular parking space 6 is a highway, a freeway, a municipal road, a road only serving parking space traffic, etc. Again with reference to FIG. 1, the orientation of the forward driving direction 16 while parking the ego motor vehicle 2, or respectively to determine the parking position 1 of the ego motor vehicle 2, may moreover be chosen depending on the degree of complexity of a driving maneuver required to park on the perpendicular parking space 6. Such a driving maneuver is for example characterized by the parking driving trajectory 15 that may be configured differently depending on which conditions prevail in the environment of the ego motor vehicle 2, or respectively the perpendicular parking space 6, for example depending on a traffic situation, or respectively traffic density. If for example the need exists to very quickly leave the road bordering the perpendicular parking space 6 in order to maintain a flow of traffic on this road, the parking position 1, or respectively the perpendicular parking space 6 may be entered by using a first parking driving trajectory 18. If less dense traffic prevails, the parking position 1, and consequently the perpendicular parking space 6, may be entered by using a second parking driving trajectory 19, wherein the second parking driving trajectory 19 and the first parking driving trajectory 18 differ in particular in that the second parking driving trajectory 19 has at least one additional step since it has first to be reversed by means of the ego motor vehicle 2 in order to then drive forward onto the perpendicular parking space 6. Moreover, a third parking driving trajectory 20 is conceivable by means of which the ego motor vehicle 2 drives backward into the perpendicular parking space 6 in one step, which also necessitates the possibility of reversing on the road bordering the perpendicular parking space 6 which, for example, may be prevented, or at least very involved or complex due to a very high traffic load on the road.

Moreover, the orientation of the forward driving direction 16 of the ego motor vehicle 2 may be determined relative to the perpendicular parking space 6 by using the particular orientation of the forward driving direction 17 of the particular adjacently parked motor vehicle 7. It is accordingly for example conceivable for a particular orientation of the forward driving direction 17 of the adjacently parked motor vehicles 7 to be taken into account in that the ego motor vehicle 2 is oriented on the perpendicular parking space 6 according to a majority of the motor vehicles 7 parked in the environment of the perpendicular parking space 6. In other words, the parking position 1 is determined by means of the control unit 9 such that the forward driving direction 16 of the ego motor vehicle 2 on the perpendicular parking space 6 corresponds to a majority orientation of the respective forward driving directions 17 of the adjacently parked motor vehicles 7.

A respective wall element 21 is drawn in parking situations in FIGS. 2a-2d that makes access to a luggage compartment lid of ego motor vehicle 2 at least difficult—see parking situations a) and b). It is therefore useful to determine the orientation of the forward driving direction 16 of the motor vehicle 2 based on whether a user of the ego motor vehicle 2 needs access to the luggage compartment of the ego motor vehicle 2. If this is the case, the method provides that the control unit 9 determines the parking position 1 such that the forward driving direction 16 of the ego motor vehicle 2 faces in the direction of the corresponding wall element 21 so that the folding element of the luggage compartment of the ego motor vehicle 2 is very easily accessible.

Figure 3:
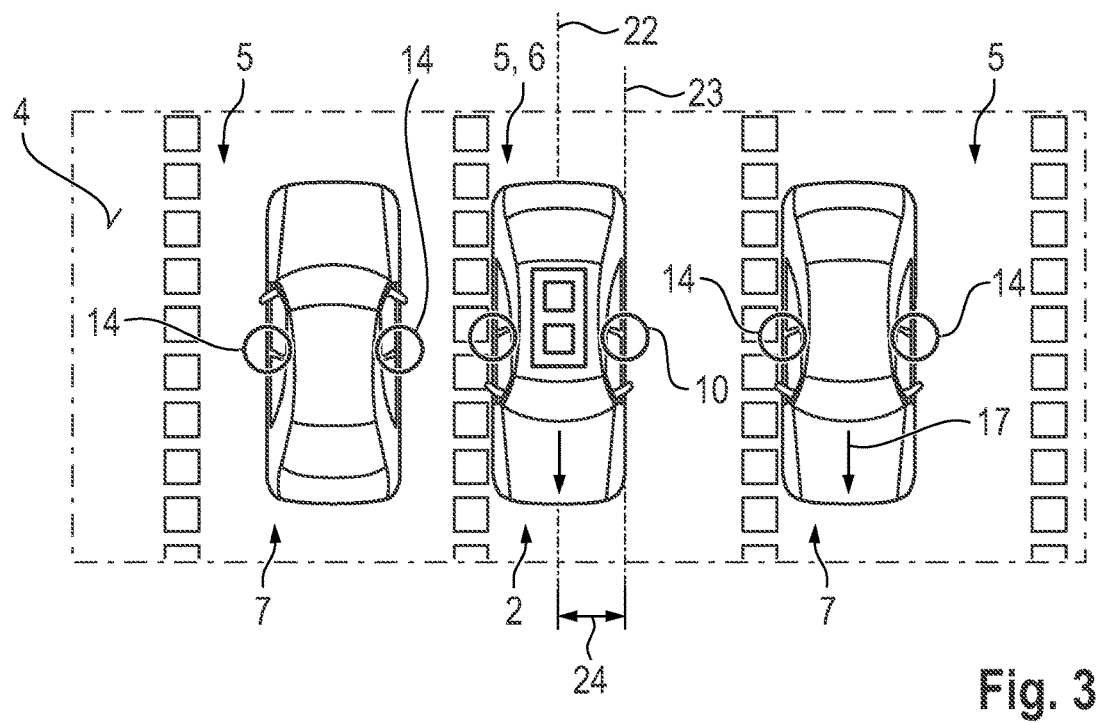
FIG. 3 shows an exemplary schematic view of the ego motor vehicle parked on the perpendicular parking space, wherein a longitudinal median plane of the ego motor vehicle and a longitudinal median plane of the perpendicular parking space do not coincide.

FIG. 3 shows a schematic view of the ego motor vehicle 2 parked on the perpendicular parking space 6, wherein a longitudinal median plane 22 of the ego motor vehicle 2 and a longitudinal median plane 23 of the perpendicular parking space 6 do not coincide. In other words, the parking position 1 is determined, or respectively ascertained by means of the control unit 9 such that the ego motor vehicle 2 parks eccentrically on the perpendicular parking space 6. Again expressed otherwise, the ego motor vehicle 2 has assumed the parking position 1 on the perpendicular parking space 6, wherein the parking position 1 has been arranged eccentrically with respect to a transverse direction of the perpendicular parking space 6. The longitudinal median planes 22, 23 are therefore at a distance from each other across a horizontal offset 24, but are (still) arranged parallel to each other. Both longitudinal median planes 22, 23 are perpendicular on the parking area 4 that has, or respectively contains the perpendicular parking spaces 5, 6.

In a comparison of FIG. 3 with FIGS. 2a-2d—parking situations a) and c)—the motivation to park eccentrically with respect to the access of parameters 10, 14 is very clear: Since the motor vehicle 7 shown on the right in FIG. 3 has parked very close to the perpendicular parking space 6, space on the driver's side of the ego motor vehicle 2 for opening the driver's door 12 would be very slight if the ego motor vehicle 2 were to park in the middle of the perpendicular parking space 6. If the longitudinal median planes 22, 23 were to coincide, i.e., if the offset 24 between the longitudinal median planes 22, 23 were zero, it would at least be difficult for the driver to exit the ego motor vehicle 2 since a distance between the driver's side of the ego motor vehicle 2 and the front passenger side of the motor vehicle 7 shown on the right would be disadvantageously very small. This is counteracted by the method in that the parking situation 1 before the ego motor vehicle 2 drives onto the perpendicular parking space 6 is determined, or respectively ascertained such that the longitudinal median planes 22, 23 do not coincide as shown. Consequently, sufficient space prevails between the ego motor vehicle 2 and the one shown one on the right of the adjacently parked motor vehicles 7 so that the driver of the ego motor vehicle 2 may open the driver's door 12 sufficiently far as intended to exit with very little effort, i.e., comfortably.

Figure 4:
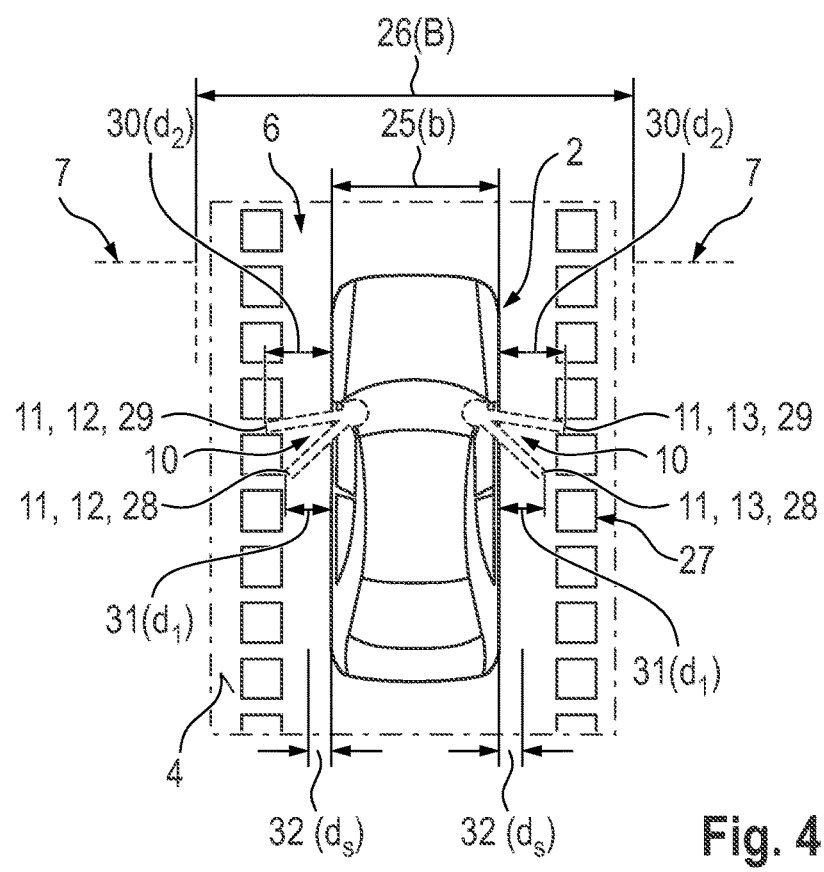
FIG. 4 shows an exemplary schematic view of the ego motor vehicle to illustrate distances relevant to parking.

To illustrate the distances that are relevant for parking the ego motor vehicle 2, FIG. 4 shows a schematic view of the ego motor vehicle 2. The ego motor vehicle 2 has the ego motor vehicle width b that bears reference sign 25 in FIG. 4. The available width B of the perpendicular parking space 6 (reference sign 26) is measured in the present case between the adjacently parking motor vehicles 7 that are only suggested in FIG. 4. If the perpendicular parking space 6 is selected for parking with the ego motor vehicle 2, wherein there is no object bordering the perpendicular parking space 6, i.e., for example no adjacently parking motor vehicle 7 on the right and left side of the perpendicular parking space 6, it may alternatively be provided that the available width 26 (B) is measured between a ground marker, or respectively parking marker 27 defining the perpendicular parking space 6. The ground marker 27 is in particular a colored marker on the parking space 4 for delimiting the perpendicular parking spaces 5, 6 visually from each other so that the driver of the motor vehicle 2, 7 to be parked may be oriented by the ground marker 27.

As already explained above, the ego motor vehicle 2 has folding elements 11, wherein reference is made to the driver's door 12 and the front passenger door 13. The doors 12, 13 of the ego motor vehicle 2 may be adjusted to a respective first catch position 28 and to a respective second catch position 29. In the respective catch positions 28, 29, the corresponding folding element 11 extends away from the ego motor vehicle 2 while forming a distance between the corresponding side of the ego motor vehicle 2 and a respective outer edge of the corresponding folding element 11. In this case (explained with reference to the example of the driver's door 12), the second distance $d_2$ or respectively the comfort distance having reference sign 30 in FIG. 4, is formed in the second catch position 29 of the driver's door 12 on the driver's side of the ego motor vehicle 2 between the outer edge of the driver's door 12 and the ego motor vehicle 2.

If contrastingly the respective folding element 11 is moved into the first catch position 28, this means (also again with reference to the example of the driver's door 12) that the first distance $d_1$, which is termed the minimum distance (reference sign 31), is formed between the driver's side of the ego motor vehicle 2 and the outside of the driver's door 12.

The access parameters 10 of the ego motor vehicle 2 characterize the respective catch positions 28, 29 of the corresponding folding element 11, i.e., for example the driver's door 12 and/or the front passenger door 13, which has been adjusted, or respectively is adjustable. In other words, the access parameters 10 characterize an ability of the respective folding element 11 to be adjusted into the respective catch position 28, 29. Consequently, the access parameters 10 characterize which of the distances 30, 31 is formed between the corresponding side of the ego motor vehicle 2 and the corresponding outer edge of the particular folding element 11 when the respective folding element 11 is adjusted into the first catch position 28, or into the second catch position 29.

To safely park the ego motor vehicle 2—in particular by means of the at least one partially automated park assistance system—a safety distance $d_S$ (reference sign 32) is established on the right and left side of the ego motor vehicle 2 that is needed so that the ego motor vehicle 2 may safely drive into the perpendicular parking space 6.

Figure 5:
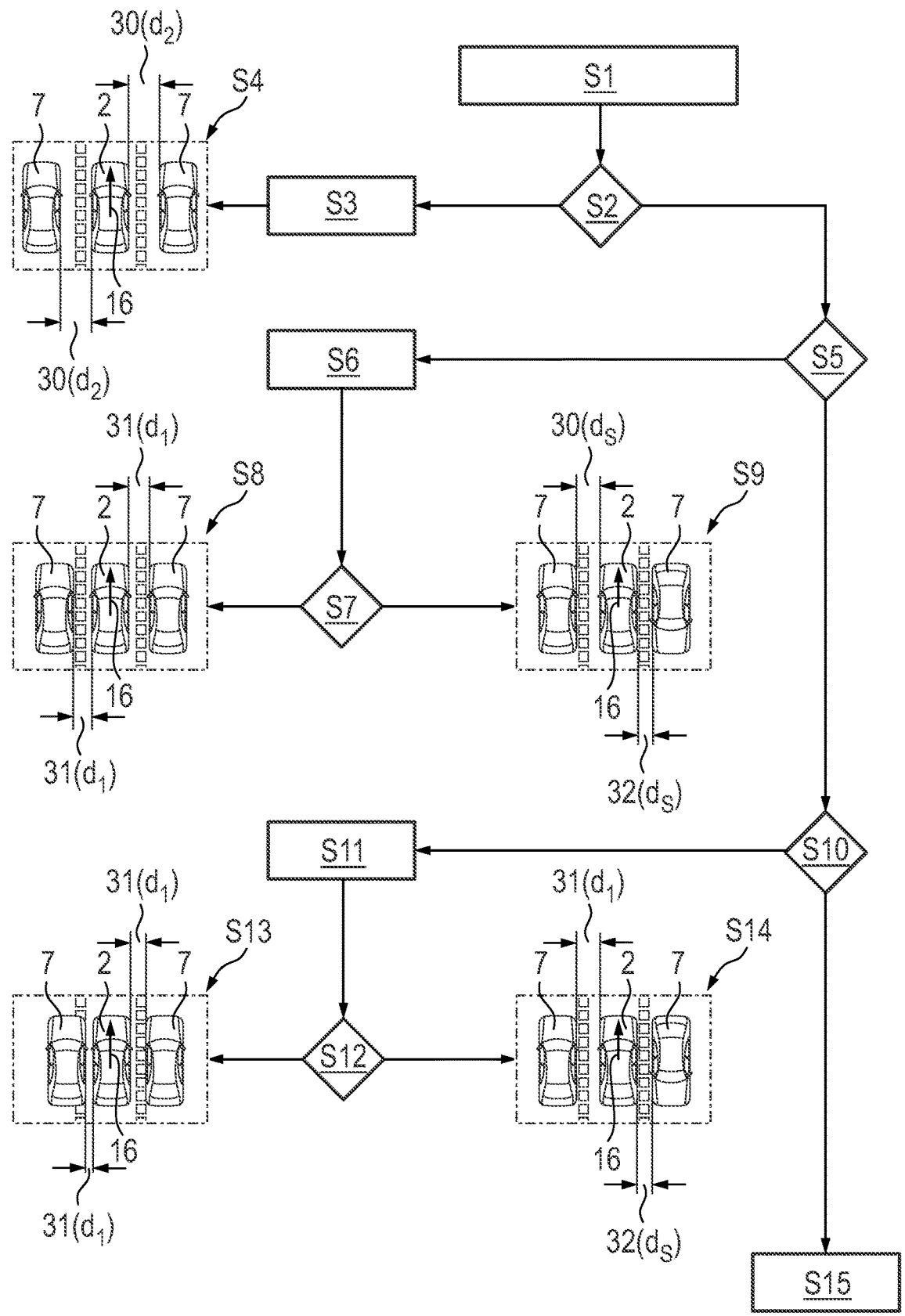
FIG. 5 shows a flowchart to illustrate steps of an embodiment of a method to determine a parking position for the ego motor vehicle.

FIG. 5 shows a flowchart to illustrate the steps of the method for determining the parking position 1 for the ego motor vehicle 2. In a first method step S1, the sensors 8 detect the perpendicular parking space 6, in particular record the dimensions of the perpendicular parking space 6 (see FIG. 4). In other words, the parking space data set then has the dimensions of the perpendicular parking space 6, for example the available width 26 (B). The parking space data set is then processed further by means of the control unit 9; in the present case, the parking space data set at least partially characterizing the perpendicular parking space 6 is investigated as to whether, taking into account the ego motor vehicle width 25 (B), the comfort distance 30, or respectively the second distance $d_2$, would exist on the right and left side of the ego motor vehicle 2 if the parking position 1 were correspondingly determined, or respectively if the ego motor vehicle 2 were to then park in the perpendicular parking space 6 corresponding to the parking position 1. In other words, method step S2 investigates whether a driver as well as a front passenger, or respectively a passenger of the ego motor vehicle 2 arranged on the front passenger side, may adjust the corresponding folding element 11 into the particular second catch position 29 or beyond. It is therefore investigated whether it would be possible for both the driver's door 12 as well as the front passenger door 13 to be adjustable into the second catch position 29 of the ego motor vehicle 2 parked by using the parking position 1. Expressed by means of a mathematical formula, it is investigated in method step S2 whether:

$$B \geq b + 2 \cdot d_2$$

If this is the case, method step S2 is followed by another method step S3 in which the perpendicular parking space 6 is categorized as a safely usable perpendicular parking space. Then in another method step S4, the parking position 1 is established such that the ego motor vehicle 2, once it is being or is parked on the perpendicular parking space with reference to the parking position 1, is parked in the middle between the adjacently parking motor vehicles 7, and in particular in the middle on the perpendicular parking space 6. This means that in the method step S4, the ego motor vehicle 2, or respectively the parking position 1, is oriented such that the longitudinal median planes 22, 23 coincide once the ego motor vehicle 2 is parked on the perpendicular parking space 6. In this case, because the ego motor vehicle 2 is parked on the perpendicular parking space 6, the second distance 30, or respectively the comfort distance $d_2$, or a greater distance, is then formed on both sides of the ego motor vehicle 2.

If, in method step S2 in which it is investigated whether the folding elements 11 are adjustable on both sides of the ego motor vehicle 2 into the second catch position 29 or further, it is established this is impossible after the ego motor vehicle 2 has parked on the perpendicular parking space 6, the dimensions of the perpendicular parking space 6, or respectively the parking space data set, is investigated in another method step S5 as to whether the perpendicular parking space 6 is a small perpendicular parking space 6. Expressed in a mathematical formula, the perpendicular parking space 6, or respectively the parking space data set characterizing the perpendicular parking space 6, is analyzed as to whether the following holds true:

$$b+2\cdot d_2 > B \geq b+2\cdot d_1$$

In a small perpendicular parking space 6 that is not a critical perpendicular parking space 6 (which will be checked below), it is impossible to simultaneously adjust the driver's door 12 and the front passenger door 13 into the second catch position 29 of the ego motor vehicle 2 when it is parked as intended on a small parking space 6. Instead, it is only possible to adjust the corresponding door 12, 13 into the first catch position 28 and beyond, but not up to the second catch position 29. Accordingly, method step S5 is followed by a method step S6 in which the perpendicular parking space 6 is categorized as a small perpendicular parking space 6.

Then method step S6 is followed by another method step S7 in which the parking situation in which the empty perpendicular parking space 6 is found is investigated as to whether a driver's door of the right adjacently parking motor vehicle 7 is facing the empty perpendicular parking space 6, and whether the comfort distance 30 ($d_2$) may be formed on at least one side of the ego motor vehicle 2. In this case "right", or respectively "left" is to be understood with reference to the forward driving direction 16 of the ego motor vehicle 2. If the driver's door of the motor vehicle 7 parked on the right is facing the perpendicular parking space 6, the method provides in another method step S8 that the parking position 1 is determined, or respectively established such that the ego motor vehicle 2 is arranged in the middle between the adjacently parking motor vehicles 7. Accordingly when parking the ego motor vehicle 2 using the determined parking position 1, the first distance 31, or respectively minimum distance $d_1$, or a greater distance (that is less than the comfort distance 30, or respectively $d_2$) is formed on both sides of the ego motor vehicle 2. In other words, the motor vehicle 7 parked on the right is then spaced from the ego motor vehicle 2 at least by the first distance 31 ($d_1$) when the ego motor vehicle 2 has finished parking. The same holds true for the motor vehicle parking on the left 7: This is at a distance from the ego motor vehicle 2 at least by the first distance 31 ($d_1$).

If the driver's door of the motor vehicle 7 parking on the right is facing away from the perpendicular parking space 6, instead of the method step S8, there is another method step S9 in which, while parking the ego motor vehicle 2 with reference to the parking position 1, the second distance 30, or respectively the comfort distance $d_2$, is formed on the driver's side of the ego motor vehicle 2, i.e., from the vehicle 7 parking on the left, wherein at least the safety distance 32 ($d_S$) is formed on the front passenger side of the ego motor vehicle 2. In other words, the ego motor vehicle 2, by using the parking position 1, is then oriented eccentrically between the adjacently parking motor vehicles 7. Consequently when determining the parking position 1, the offset 24 is chosen, or respectively measured between the longitudinal median planes 22, 23 such that, while the ego motor vehicle 2 is driving onto the parking position 1, at least the safety distance 32 ($d_S$) is provided on the left side of the comfort distance 30 ($d_2$) and on the right side.

If, in method step S5, in which it is checked whether the folding elements 11, or respectively the doors 12, 13, are adjustable on both sides of the ego motor vehicle 2 into the first catch position 28 or further, it is established that this will be impossible after the ego motor vehicle 2 has parked on the perpendicular parking space 6, the dimensions of the perpendicular parking space 6, or respectively the parking space data set, are investigated in another method step S10 as to whether the perpendicular parking space 6 is a critical perpendicular parking space 6. Expressed in a mathematical formula, the perpendicular parking space 6, or respectively the parking space data set characterizing the perpendicular parking space 6, is analyzed as to whether the following holds true:

$$b+2\cdot d_1 > B \geq b+2\cdot d_S$$

In a critical perpendicular parking space 6 that is still a safely useful perpendicular parking space 6 (which will be checked below), it is impossible to simultaneously adjust the driver's door 12 and the front passenger door 13 into the first catch position 28 of the ego motor vehicle 2 when it is parked as intended on the critical parking space 6. Instead, it is only possible to move the corresponding door 12, 13 out of the completely closed position, but not into the first position 28. Accordingly, method step S10 is followed by a method step S11 in which the perpendicular parking space 6 is categorized as a critical perpendicular parking space 6.

Then method step S11 is followed by another method step S12 in which the parking situation in which the empty perpendicular parking space 6 is found is investigated as to whether a driver's door of the right adjacently parking motor vehicle 7 is facing the empty perpendicular parking space 6, and whether the minimum distance 31 ($d_1$) may be formed on at least one side of the ego motor vehicle 2. If the driver's door of the motor vehicle 7 parked on the right is facing the perpendicular parking space 6, the method provides in another method step S13 that the parking position 1 is determined, or respectively established such that the ego motor vehicle 2 is arranged in the middle between the adjacently parking motor vehicles 7. Accordingly when parking the ego motor vehicle 2 using the determined parking position 1, the safety distance $d_S$, or a greater distance (that is less than the minimum distance 31, or respectively $d_1$) is formed on both sides of the ego motor vehicle 2. In other words, the motor vehicle 7 parked on the right is then spaced from the ego motor vehicle 2 at least by the safety distance 32 ($d_S$) when the ego motor vehicle 2 has finished parking. The same holds true for the motor vehicle parking on the left 7: This is at a distance from the ego motor vehicle 2 at least by safety distance 32 ($d_S$).

If the driver's door of the motor vehicle 7 parking on the right is facing away from the perpendicular parking space 6, instead of the method step S13, there is another method step S14 in which, while parking the ego motor vehicle 2 with reference to the parking position 1, the first distance 31, or respectively the minimum distance $d_1$, is formed on the driver's side of the ego motor vehicle 2, i.e., from the vehicle 7 parking on the left, wherein at least the safety distance 32 ($d_S$) is formed on the front passenger side of the ego motor vehicle 2. In other words, the ego motor vehicle 2, by using the parking position 1, is then oriented eccentrically between the adjacently parking motor vehicles 7. Consequently when determining the parking position 1, the offset 24 is chosen, or respectively measured between the longitudinal median planes 22, 23 such that, while the ego motor vehicle 2 is driving onto the parking position 1, the first distance 31 ($d_1$) is provided on the left side at least the safety distance 32 ($d_S$) is provided on the right side.

If, in method step S10, in which it is checked whether the folding elements 11, or respectively the doors 12, 13, are adjustable on both sides of the ego motor vehicle 2 into the first catch position 28 or further, it is established that, after the ego motor vehicle 2 has parked on the perpendicular parking space 6, the doors are not adjustable into the first catch position 28, the perpendicular parking space 6 is then a perpendicular parking space 6 that cannot be safely used. This means that the perpendicular parking space 6 satisfies the following condition:

$$B < b + 2 \cdot d_S$$

A perpendicular parking space 6 with such a width 26 (B) does not offer enough space on the right and left side of the ego motor vehicle 2 in order to safely, in particular at least partially automatically, fully automatically, or autonomously, drive the ego motor vehicle 2 into/onto the perpendicular parking space 6 in order to park it there. In this case, method step S10 is followed by another method step S15 in which the perpendicular parking space 6 is categorized as a not safely usable perpendicular parking space 6 (too small). After this method step S15, the search for a parking space is then to be continued, or the ego motor vehicle 2 is to be manually parked, wherein particular attention is then to be given to the parking maneuver and the opening of the folding elements 11 so as not to damage the adjacently parking motor vehicles 7 when parking the ego motor vehicle 2.

Figure 6:
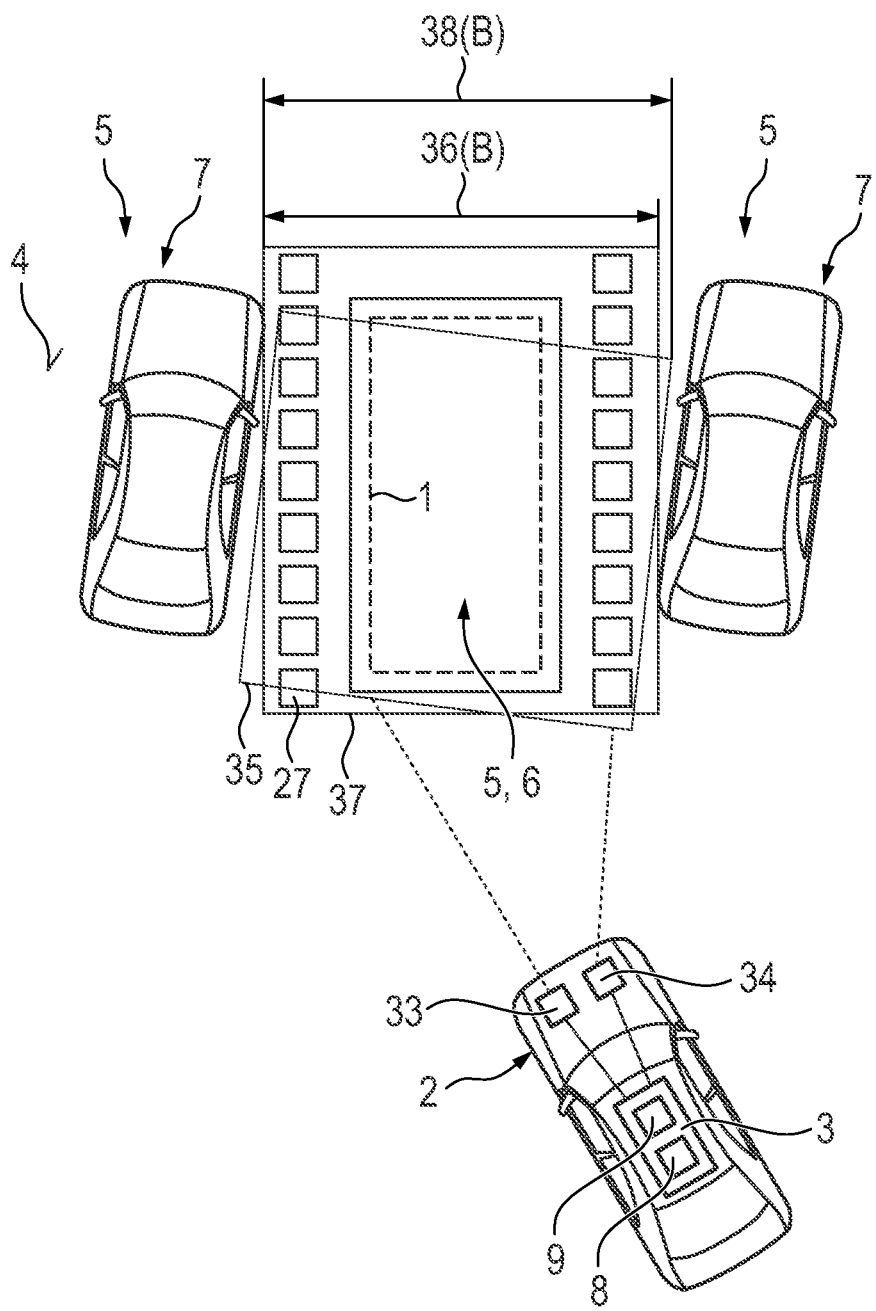
FIG. 6 shows an exemplary schematic view of the perpendicular parking space that is detected by means of two sensor units.

FIG. 6 shows a schematic view of the perpendicular parking space 6 that is detected by means of two sensor units 33, 34. The sensor units 33, 34 are in particular part of the driver assistance system 3, for example the sensor system 8. This means that the ego motor vehicle 2 that is equipped with the driver assistance system 3 has the sensor system 8 and consequently the sensor units 33, 34. While the perpendicular parking space 6 is being detected with the two sensor units 33, 34, the first sensor unit 33 detects the ground marker 27 of the perpendicular parking space 6. Moreover, the second sensor system 34 detects a free volume 35 of the perpendicular parking space 6, for example simultaneously or subsequently. The free volume 35 of the perpendicular parking space 6 is characterized in that it is free of objects, in particular motor vehicles 7, so that the free volume 35 of the perpendicular parking space 6 is available, or respectively may be used for parking. The free volume 35 is moreover arranged above the parking area 4, i.e., the free volume 35 is delimited at its bottom side by the parking area 4.

Since the first sensor unit 33 detects the ground marker 27 of the perpendicular parking space 6, the first sensor unit 33 provides a reference data set; for example, the first sensor unit 33 provides the reference data set to the control unit 9. Accordingly, the second sensor unit 34, while detecting the free volume 35, provides a free volume data set; in particular, the second sensor unit 34 provides the free volume data set to the control unit 9. The reference data set and the free volume data set are then further processed by means of the control unit 9 into the parking space data set, or connected to the parking space data set by way of IT, or respectively linked thereto, so that the control unit 9 subsequently determines, or respectively establishes the parking position 1 based on the reference data set and on the free volume data set, as well as perhaps using the parking space data set.

The first sensor unit 33, by means of which the ground marker 27 of the perpendicular parking space 6 is detected, is in particular designed as an image processing sensor unit. This means that the ground marker 27 of the perpendicular parking space 6 is detected by the image processing sensor unit 33. Contrastingly, the second sensor value 34 is a sensor unit that is based on a different sensor principle than the first sensor unit 33. In the present example, the sensor unit 34 is designed as a radar sensor unit.

Since the perpendicular parking space 6 is detected by the at least two sensor units 33, 34, the parking space data set very precisely characterizing the perpendicular parking space 6 may then be generated, after which the parking position 1 may be determined, or respectively ascertained very efficiently with respect to the perpendicular parking space 6. Moreover in a parking situation as shown in FIG. 6, it may occur that the free volume 35, for which it is simply assumed that it has a rectangular ground surface, and the ground marker 27, for which it is also simply assumed that it borders a rectangular perpendicular parking space 6, overlap each other obliquely. As shown, this is the case in following example since the motor vehicles 7 parked adjacently to the perpendicular parking space 6 have been arranged, or respectively parked obliquely on their particular perpendicular parking space 5. In this case, it may be that parking the ego motor vehicle 2 in the middle with reference to the ground markers 27 would restrict the opening of at least one folding element 11 of the ego motor vehicle 2 so that, starting from the parking situation shown in FIG. 6, eccentric parking between the ground marker 27 of the perpendicular parking space 6 may be provided in the method. On the one hand, it is possible to equate the available width B with an edge length 36 of a rectangular free area 37, wherein the width, or respectively edge length 36 of the rectangular free area 37 is between a first point of the motor vehicle 7 adjacently parking on the left and a second point of the motor vehicle 7 adjacently parking on the right, wherein these two points of the adjacently parking motor vehicles 7 that determine the edge length 36 are both arranged closest to the perpendicular parking space 6. This means that to thereby establish the parking position 1, the available width 26 of the perpendicular parking space 6 is determined by the edge length 36 of the free area 37.

Alternatively, it may be provided that the available width 26 of the perpendicular parking space 6 is only determined at the height of the driver's door 12 of the ego motor vehicle 2. This is identified by a distance 38 in FIG. 6 that is between the motor vehicle 7 adjacently parking on the left and the motor vehicle 7 adjacently parking on the right at the height of the driver's door 12 of the ego motor vehicle 2 when it is parked in the perpendicular parking space 6. In other words, the distance 38 between the adjacently parking motor vehicles 7 is measured there with reference to the parking position 1 between the motor vehicles 7 where the driver's door 12 of the ego motor vehicle 2 will be arranged according to the parking position 1. This distance 38 is then used as the available width 26 (B) to for example determine the offset 24.

LIST OF REFERENCE NUMERALS

1 Parking position
2 Ego motor vehicle
3 Driver assistance system
4 Parking area
5 Perpendicular parking space
6 Perpendicular parking space
7 Motor vehicle
8 Sensor system
9 Control unit
10 Access parameter
11 Folding element
12 Driver's door
13 Front passenger door
14 Access parameter
15 Parking driving trajectory
16 Forward driving direction
17 Forward driving direction
18 First parking driving trajectory
19 Second parking driving trajectory
20 Third parking driving trajectory
21 Wall element
22 Longitudinal median plane
23 Longitudinal median plane
24 Offset
25 Motor vehicle width
26 Available width
27 Ground marker
28 First catch position
29 Second catch position
30 Second distance (comfort distance)
31 First distance (minimum distance)
32 Safety distance
33 Sensor unit
34 Sensor unit
35 Free volume
36 Edge length
37 Free area
38 Distance
S1 Method step
S2 Method step
S3 Method step
S4 Method step
S5 Method step
S6 Method step
S7 Method step
S8 Method step
S9 Method step
S10 Method step
S11 Method step
S12 Method step
S13 Method step
S14 Method step
S15 Method step The invention has been described in the preceding using various exemplary embodiments. Other variations to the disclosed embodiments may be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The term "exemplary" used throughout the specification means "serving as an example, instance, or exemplification" and does not mean "preferred" or "having advantages" over other embodiments. The term "in particular" used throughout the specification means "serving as an example, instance, or exemplification".

The mere fact that certain measures are recited in mutually different dependent claims or embodiments does not indicate that a combination of these measures cannot be used to advantage. Any reference signs in the claims should not be construed as limiting the scope.

What is claimed is:

1. A method for determining a parking position for a motor vehicle, comprising:
   detecting a perpendicular parking space by a sensor system of the motor vehicle;
   providing a parking space data set characterizing the perpendicular parking space is to a control unit of the motor vehicle; and
   determining the parking position by the control unit by using the parking space data set, as well as by using an access parameter of the motor vehicle that characterizes a possible opening of at least one folding element of the motor vehicle; wherein
   the parking position is established using an additional access parameter of an additional motor vehicle that is parked adjacent to the parking position.

2. The method of claim 1, comprising: determining an orientation of a forward driving direction of the motor vehicle with respect to the perpendicular parking space to determine the parking position by the control unit by using the parking space data set and by using the access parameter.

3. The method of claim 2, wherein the orientation of the forward driving direction of the motor vehicle with respect to the perpendicular parking space is determined by using at least one of the following conditions:
   a road type bordering the perpendicular parking space,
   a complexity of a driving maneuver needed to drive onto the perpendicular parking space,
   an orientation of the forward driving direction of the adjacently parking motor vehicle, and
   a load state of a luggage compartment of the motor vehicle.

4. The method of claim 1, comprising: determining an offset between a perpendicular longitudinal median plane of the motor vehicle and a perpendicular longitudinal median plane of the perpendicular parking space to determine the parking position by the control unit by using the parking space data set and by using the access parameters.

5. The method of claim 1, comprising: based on an available width of the perpendicular parking space, a motor vehicle width, and the access parameter that characterizes an open position of the folding element, classifying the perpendicular parking space into one of the following categories by the control unit:
   a safely usable perpendicular parking space,
   a small perpendicular parking space,
   a critical perpendicular parking space, and
   a not safely usable perpendicular parking space.

6. The method of claim 5, comprising: when the perpendicular parking space is categorized as a small perpendicular parking space, determining the parking position by the control unit such that a comfort distance to the adjacently parking motor vehicle is provided at at least one of the folding elements of the motor vehicle.

7. The method of claim 5, comprising: when the perpendicular parking space is categorized as a critical perpendicular parking space, determining the parking position by the control unit such that a minimum distance to the adjacently parking motor vehicle is provided at at least one of the folding elements of the motor vehicle.

8. The method of claim 1, wherein two sensor units of the sensor system that are designed different from each other are used to detect the perpendicular parking space, wherein a first one of these sensor units detects a ground marker defining the perpendicular parking space in order to provide the control unit with a reference data set partially characterizing the perpendicular parking space, and a second one of these sensor units detects a free volume of the perpendicular parking space in order to provide the control unit with a free volume data set partially characterizing the perpendicular parking space so that the parking space data set is provided to the control unit by the sensor system based on the reference data set and the free volume data set, and a corresponding parking position is consequently ascertained.

9. A driver assistance system for determining a parking position for a motor vehicle, the driver assistance system configured for:
- detecting a perpendicular parking space by a sensor system of the motor vehicle;
- providing a parking space data set characterizing the perpendicular parking space to a control unit of the motor vehicle; and
- determining the parking position by the control unit by using the parking space data set, as well as by using an access parameter of the motor vehicle that characterizes a possible opening of at least one folding element of the motor vehicle; wherein
- the parking position is established using an additional access parameter of an additional motor vehicle that is parked adjacent to the parking position.

10. A motor vehicle with a driver assistance system configured for:
- detecting a perpendicular parking space by a sensor system of the motor vehicle;
- providing a parking space data set characterizing the perpendicular parking space to a control unit of the motor vehicle; and
- determining the parking position by the control unit by using the parking space data set, as well as by using an access parameter of the motor vehicle that characterizes a possible opening of at least one folding element of the motor vehicle; wherein
- the parking position is established using an additional access parameter of an additional motor vehicle that is parked adjacent to the parking position.

11. The method of claim 2, comprising: determining an offset between a perpendicular longitudinal median plane of the motor vehicle and a perpendicular longitudinal median plane of the perpendicular parking space to determine the parking position by the control unit by using the parking space data set and by using the access parameters.

12. The method of claim 3, comprising: determining an offset between a perpendicular longitudinal median plane of the motor vehicle and a perpendicular longitudinal median plane of the perpendicular parking space to determine the parking position by the control unit by using the parking space data set and by using the access parameters.

13. The method of claim 2, comprising: based on an available width of the perpendicular parking space, a motor vehicle width, and the access parameter that characterizes an open position of the folding element, classifying the perpendicular parking space into one of the following categories by the control unit:
- a safely usable perpendicular parking space,
- a small perpendicular parking space,
- a critical perpendicular parking space, and
- a not safely usable perpendicular parking space.

14. The method of claim 3, comprising: based on an available width of the perpendicular parking space, a motor vehicle width, and the access parameter that characterizes an open position of the folding element, classifying the perpendicular parking space into one of the following categories by the control unit:
- a safely usable perpendicular parking space,
- a small perpendicular parking space,
- a critical perpendicular parking space, and
- a not safely usable perpendicular parking space.

15. The method of claim 4, comprising: based on an available width of the perpendicular parking space, a motor vehicle width, and the access parameter that characterizes an open position of the folding element, classifying the perpendicular parking space into one of the following categories by the control unit:
- a safely usable perpendicular parking space,
- a small perpendicular parking space,
- a critical perpendicular parking space, and
- a not safely usable perpendicular parking space.

16. The method of claim 13, comprising: when the perpendicular parking space is categorized as a small perpendicular parking space, determining the parking position by the control unit such that a comfort distance to the adjacently parking motor vehicle is provided at at least one of the folding elements of the motor vehicle.

17. The method of claim 14, comprising: when the perpendicular parking space is categorized as a small perpendicular parking space, determining the parking position by the control unit such that a comfort distance to the adjacently parking motor vehicle is provided at at least one of the folding elements of the motor vehicle.

18. The method of claim 15, comprising: when the perpendicular parking space is categorized as a small perpendicular parking space, determining the parking position by the control unit such that a comfort distance to the adjacently parking motor vehicle is provided at at least one of the folding elements of the motor vehicle.

19. The method of claim 13, comprising: when the perpendicular parking space is categorized as a critical perpendicular parking space, determining the parking position by the control unit such that a minimum distance to the adjacently parking motor vehicle is provided at at least one of the folding elements of the motor vehicle.

20. The method of claim 14, comprising: when the perpendicular parking space is categorized as a critical perpendicular parking space, determining the parking position by the control unit such that a minimum distance to the adjacently parking motor vehicle is provided at at least one of the folding elements of the motor vehicle.

* * * * *